US008369830B2

(12) United States Patent
Sperti et al.

(10) Patent No.: US 8,369,830 B2
(45) Date of Patent: Feb. 5, 2013

(54) METHOD AND SYSTEM FOR DETECTING ATTACKS IN WIRELESS DATA COMMUNICATIONS NETWORKS

(75) Inventors: Luigi Sperti, Turin (IT); Maria José Mollo, Turin (IT); Federico Frosali, Turin (IT); Giorgio Freguglia, Turin (IT)

(73) Assignee: Telecom Italia S.p.A., Milan (IT)

( * ) Notice: Subject to any disclaimer, the term of this patent is extended or adjusted under 35 U.S.C. 154(b) by 1162 days.

(21) Appl. No.: 11/794,249

(22) PCT Filed: Dec. 30, 2004

(86) PCT No.: PCT/EP2004/053730
§ 371 (c)(1),
(2), (4) Date: Oct. 29, 2007

(87) PCT Pub. No.: WO2006/069604
PCT Pub. Date: Jul. 6, 2006

(65) Prior Publication Data
US 2008/0043686 A1    Feb. 21, 2008

(51) Int. Cl.
*H04M 1/66* (2006.01)
(52) U.S. Cl. ........ 455/410; 455/411; 455/418; 455/433; 370/338; 713/201
(58) Field of Classification Search .................. 370/338; 455/410–411, 418, 433; 713/201
See application file for complete search history.

(56) References Cited

U.S. PATENT DOCUMENTS
2003/0135762 A1    7/2003  Macaulay
2004/0003285 A1*   1/2004  Whelan et al. ................ 713/201
2004/0049699 A1*   3/2004  Griffith et al. ................ 713/201
2004/0208151 A1*  10/2004  Haverinen et al. ........... 370/338
2004/0252837 A1*  12/2004  Harvey et al. ................ 380/270
2005/0172153 A1*   8/2005  Groenendaal ................ 713/201

FOREIGN PATENT DOCUMENTS
WO    WO 03/088547 A2    10/2003
WO    WO 03/100559 A2    12/2003

OTHER PUBLICATIONS

Airwave Wireless, Inc., "AirWave Rogue Access Point Detection", XP-002319028, 2 pages, (2002).
Chirumamilla, et al., "Agent Based Intrusion Detection and Response System for Wireless LANs", 2003 IEEE Conference on Communications: IEEE, US, vol. 1 of 5, pp. 492-496, (2003).
B. Aboba et al; "Extensible Authentication Protocol (EAP)", Network Working Group, Request for Comments: 3748, Category: Standards Track, pp. 1-60, (2004).

(Continued)

*Primary Examiner* — Kamran Afshar
*Assistant Examiner* — Yousef Rod
(74) *Attorney, Agent, or Firm* — Finnegan, Henderson, Farabow, Garrett & Dunner, L.L.P.

(57) ABSTRACT

A method of detecting attacks in a wireless data communications network, includes: monitoring wireless traffic over the wireless data communications network; deriving a first network state from the monitored wireless traffic; acquiring trusted information indicative of a wireless network state from at least one apparatus of a network infrastructure; establishing a second network state based on the acquired trusted information; comparing the derived first network state with the second network state, and determining a wireless network attack in case of incoherence between the derived first network state compared to the second network state.

27 Claims, 8 Drawing Sheets

OTHER PUBLICATIONS

J. Arkko et al.; Extensible Authentication Protocol Method for $3^{rd}$ Generation Authentication and Key Agreement (EAP-AKA), Network Working Group, Internet-Draft, pp. 1-72, (2004).

N. Cam-Winget et al.; EAP Flexible Authentication via Secure Tunneling (EAP-FAST), Network Working Group, Internet-Draft, pp. 1-49, (2004).

H. Haverinen et al.; Extensible Authentication Protocol Method for GSM Subscriber Identity Modules (EAP-SIM), Network Working Group, Internet-Draft, pp. 1-81, (2004).

L. Yang et al.; Architecture Taxonomy for Control and Provisioning of Wireless Access Points (CAPWAP), CAPWAP Working Group, Internet-Draft, pp. 1-40, (2004.

P. Funk et al.; EAP Tunneled TLS Authentication Protocol (EAP-TTLS), PPPEXT Working Group, Internet-Draft, Category: Standards Track, pp. 1-49, (2004).

A. Palekar et al.; "Protected EAP Protocol (PEAP) Version 2", EAP Working Group, Internet-Draft, Category: Informational, pp. 1-83, (2004).

S. Fluhrer et al.; "Weaknesses in the Key Scheduling Algorithm of RC4", Lecture Notes in Computer Science, vol. 2259, 23 pages, (2001).

IEEE Wireless LAN Edition, A compilation based on IEEE Std 802.11™—1999 (R2003) and its amendments, IEEE Standards, pp. 1-706, (2003).

* cited by examiner

| | | IEEE 802.11i State Table | | | | | | | | | | | |
|---|---|---|---|---|---|---|---|---|---|---|---|---|---|
| | | IEEE 802.11 parameters | | | | | | IEEE 802.11i parameters | | | | | |
| STA | ch | BSSID | ESSID | 802.11 Auth. Type | Ass. state | Auth. state | 802.11 Cryptographic ciphersuite | Authentication and Key Management Protocol PSK/802.1x | EAP method negotiated | EAP ID | 802.1x state | Pairwise Cryptographic ciphersuite | Group Cryptographic ciphersuite | 4-way handshake state |
| MAC_CL1 | 1 | MAC_AP1 | WiFi1 | open | Ass. | Auth. | none | 802.1x | LEAP | ID_CL1 | Auth.'d | TKIP | TKIP | none |
| MAC_CL2 | 1 | MAC_AP1 | WiFi2 | open | Ass. | Auth. | none | 802.1x | PEAPv2 | ID_CL2 | Auth.'d | TKIP | wep | third |
| MAC_CL3 | 4 | MAC_AP2 | WiFi3 | open | Ass. | Auth. | none | 802.1x | EAP-TLS | Cert_CL3 | Auth'ing | CCMP | WEP | fourth |
| MAC_CL4 | 11 | MAC_AP3 | WiFi4 | open | Disass. | Deauth. | wep | none | none | none | none | none | none | none |
| MAC_CL5 | 1 | MAC_AP | WiFi | shared | Ass. | Auth. | none | none | none | none | none | none | none | none |
| MAC_CL6 | 1 | MAC_AP | WiFi | open | Ass. | Auth. | none | PSK | none | none | none | TKIP | WEP | first |
| MAC_CL1 | 1 | MAC_AP | WiFi | open | Ass. | Auth. | none | 802.1x | LEAP | ID_CL1 | Deauth. | none | none | none |

METHOD AND SYSTEM FOR DETECTING ATTACKS IN WIRELESS DATA COMMUNICATIONS NETWORKS

CROSS REFERENCE TO RELATED APPLICATION

This application is a national phase application based on PCT/EP2004/053730, filed Dec. 30, 2004.

FIELD OF THE INVENTION

The present invention generally relates to the field of telecommunications, particularly to data communications networks and, even more particularly, to wireless data communications networks. More specifically, the invention concerns systems and methods for improving the security of wireless data communication networks, particularly wireless data communications networks complying with the standard IEEE (Institute of Electrical and Electronics Engineers) 802.11.

BACKGROUND OF THE INVENTION

Advantages in terms of ease of installation and use of wireless connections, low cost of hardware equipment, good performances in terms of maximum bit-rate comparable to that of wired data communications networks have favored, over the last years, a wide spread of Wireless Local Area Networks (WLANs).

Most WLAN deployments comply with the IEEE 802.11 standard, commonly called "Wi-Fi", a short term for "Wireless Fidelity". The IEEE 802.11 standard, available on the Internet for download via the URL: http://standards.ieee.org/getieee802/802.11.html (at the filing date of the present patent application), specifies the Medium Access Control (MAC) and physical (PHY) layers for devices capable of operation in the unlicensed Industrial, Scientific, and Medical (ISM) radio bands (2.4 GHz and 5 GHz).

In the present description, the terms Wi-Fi network, WLAN and wireless LAN are used as synonyms.

WLANs are however less secure than conventional wired LANs as they rely on radio as communication medium. In a wireless network it is then hard to control the exact extension range of the network; in the case of a company's WLAN, for example, the radio signal can easily get over the boundary of the company site and an attacker, with a suitable antenna, can passively monitor ("sniff", in jargon) Wi-Fi traffic without the need to access neither physically nor logically the network.

For this reason, within the IEEE 802.11 standard, the Wired Equivalent Privacy (WEP) protocol has been defined, to implement authentication and confidentiality.

Nevertheless, the WEP protocol suffers from some weaknesses: in particular, it does not provide for a mutual authentication mechanism, it relies on the use of static coding keys shared between the Access Points (APs) and the mobile STAtions (STAs) of the wireless network, and it does not implement any mechanism for key distribution and dynamic key update over time. Moreover, the WEP protocol suffers from a serious flaw, described in S. Fluhrer, I. Mantin and A. Shamir, "Weaknesses in the Key Scheduling Algorithm of RC4", Lecture Notes in Computer Science, vol. 2259, year 2001, which makes it possible for an attacker to discover the WEP key just by sniffing a certain amount of Wi-Fi data traffic (typically, of the order of millions of data packets). More recently, even more effective attacks against the WEP protocol, based on statistical cryptanalysis, have been documented (e.g., as reported at http://weplab.sourceforge.net/at the filing date of the present patent application) able to crack the WEP key by sniffing hundreds of thousands, rather than millions, of data packets.

These WEP protocol weaknesses, together with the absence of any authentication of the management and control messages, and the absence of a Cryptographic Message Integrity Check (MIC) of the Wi-Fi data packet contribute to make Wi-Fi networks insecure. Exploiting these vulnerabilities, an attacker can implement different kinds of attack, specific of Wi-Fi networks, like jamming, war-driving, management and control messages forgery, WEP cracking, layer 2 man in the middle, etc.

In addition to such Wi-Fi specific attacks, Wi-Fi networks are also subject to conventional (wired) LAN attacks that exploit vulnerabilities of layers 3 and above of the OSI (Open System Interconnect) seven layers model: in fact, wireless LANs operate according to the same protocols used in IEEE 802 wired LANs over those layers. Some examples of threats that affect both conventional, wired LANs and wireless LANs are IP spoofing, ARP cache poisoning, SYN Flood DoS (Denial of Service) attack, Teardrop attacks, Trojan Horses, application specific attacks etc..

To mitigate the above-discussed security threats, the IEEE 802.11 group has defined an amendment to the IEEE 802.11 standard, called IEEE 802.11i and commercially known as Wi-Fi Protected Access (WPA), which constitutes a new security standard for Wi-Fi networks.

Several solutions have been proposed for defining systems adapted to detect intrusions in Wi-Fi networks.

For example, In US 2003/0135762 a system and a method are described for monitoring IEEE 802.11 (a/b/g) wireless networks and detecting, neutralizing and locating unauthorized or eavesdropping, threatening IEEE 802.11 devices. The security system comprises a network appliance subsystem (WIT server, a wireless intrusion detection system that specifically focuses on the MAC and data-link layer of IEEE 802.11 networks based on information gathered sniffing the wireless traffic) and a portable computing subsystem, with data means to interface between the two systems. The WIT Server comprises an analysis module that looks for IEEE 802.11 specific attack patterns using real-time analysis and contains configurations related to alert levels and security policy configurations. Employing the WIT software in combination with a specially-developed antenna system, the physical location of the intruding device can be established. The neutralization capabilities of the system allow for automatic, remote counter-measures against the intruding device.

As another example, WO 03/088547 relates to the monitoring of a WLAN, by receiving transmissions exchanged between one or more stations and an AP in the WLAN. A database is compiled based on the sniffed wireless transmissions. The received transmissions are analyzed to determine the state of the stations. The compiled database and the determined state of the stations are used to diagnose connectivity/problems of the stations. The database is updated based on the concepts of "node element", "session element" and "channel element", and thanks to this information the "detector" (a particular station in the WLAN environment) can detect a list of security events and performance events (referred to the IEEE 802.11 protocol) like AP with WEP disabled, unauthorized AP, spoofed MAC address, AP with weak signal strength and so on.

As a still further example, WO 03/100559 describes a network security system and method for enhancing network security in the variant of IEEE 802.11. The system comprises a System Data Store (SDS) capable of storing different kind of information; a first Communication Interface (CI) comprising a wireless receiver that receives inbound communications and a wireless transmitter that transmits outbound communications from a communication channel associated with the CI; a System Processor (SP) comprising one or more processing elements, wherein the SP is in communication with the SDS and wherein the SP is programmed or adapted to perform different steps. The step of the Intrusion Detection System (IDS) listens to wireless network traffic and analyses all packets passing through four detection systems, and performs different tests, serially or in parallel: signature-based testing, protocol-based testing, anomaly-based testing, policy deviation-based testing. The system can react to intercepted attacks passively (alert generation and notification) and actively (AP configuration changes, use of honeypots). The system also supports localization of the attack source based on triangulation.

SUMMARY OF THE INVENTION

The Applicant has observed that, up to now, the problem of lack of security of WLANs cannot be said to have been solved.

The use of the IEEE 802.11i standard in IEEE 802.11 networks increases indeed the level of security of Wi-Fi networks, nevertheless, the IEEE 802.11i standard suffers from various flaws, partly due to native vulnerabilities of the IEEE 802.11 standard, and partly due to IEEE 802.11i vulnerabilities and specific design flaws of the authentication protocol adopted. Different kinds of attacks can be carried out against Wi-Fi networks also in presence of IEEE 802.11i implementations, such as DoS attacks, man-in-the-middle attacks, downgrading cipher suite attacks, etc. Moreover, because of the late IEEE 802.11i standardization, there are currently many WLAN deployments which implements pre-standard versions of the IEEE 802.11i, adopting only some elements of the final standard (like, for example, IEEE 802.1X for authentication, largely used in enterprise deployments). In these cases, most of the previously illustrated attacks are still applicable, depending on the security features implemented.

In the present description, the term "IEEE 802.11i implementations" is meant to include both implementations of pre-standard versions of IEEE 802.11i (including only a subset of the security features provided by the final IEEE 802.11i standard, such as IEEE 802.1X for authentication) and standard fully compliant implementations.

The insecurity of WLANs is a non-negligible concern, also in consideration of the fact that WLANs can be used as access networks to corporate wired LANs, or to the Internet in public hot spots, and as "cable replacement" to provide local Ethernet connectivity between wireless clients in domestic broadband access networks. WLANs are nowadays untrusted doors to wired LANs.

The solutions proposed in US 2003/0135762, WO 03/088547 and WO 03/100559 are not satisfactory, particularly because they do not provide useful techniques for detecting attacks that exploit the vulnerability of the IEEE 802.11i standard; moreover, the Applicant observes that in all the techniques proposed in those documents, the only source of information for the detection of attacks is the wireless traffic.

The method and system in accordance to the present invention provide security solutions for the detection of attacks, known or unknown, over IEEE 802.11 networks, also in presence of IEEE 802.11i implementations.

In particular, the method and system according to the present invention are specially designed to detect attacks originated from the wireless LAN against the wired LAN and the wireless LAN itself.

The Applicant has found that attacks to a WLAN can be efficiently detected using two kinds of information source: information to be monitored coming from the "over-the-air" traffic, and trusted information coming from the wired network to which the wireless network is associated (e.g., from access points, authentication servers and, optionally, other elements of the wired network).

For the purposes of the present invention, by "trusted" information there is intended information obtained or derived from "trusted" information sources; trusted sources include apparatuses of the network infrastructure that are able to provide authentic and authenticated information about the state of the wireless network; such trusted information are acquired through trusted communication channels, e.g. the wired network; thus, the trusted information obtained are not susceptible of being forged by wireless network attackers, and provide a reliable basis for establishing a trusted network state.

According to an aspect of the present invention, a method for detecting attacks in a wireless data communications network comprises:

monitoring wireless traffic over the wireless data communications network;

deriving a first network state from the monitored wireless traffic;

acquiring trusted information indicative of a wireless network state from at least one apparatus of a network infrastructure;

establishing a second network state based on the acquired trusted information;

comparing the derived first network state with the second network state; and determining a wireless network attack in case of incoherence between the derived first network state compared to the second network state.

According to another aspect of the present invention, a system for detecting attacks in a wireless data communications network, comprises:

a wireless traffic monitor adapted to monitor wireless traffic and to derive a first network state from the monitored wireless traffic;

a network infrastructure apparatus monitor adapted to acquire trusted information indicative of a wireless network state from at least one apparatus of a network infrastructure and to establish a second network state based on the acquired trusted information; and an attack detector engine adapted to compare the derived first network state with the second network state and to determine a wireless network attack in case of incoherence between the first network state compared to the second network state.

Other aspects of the present invention concerns aq wireless data communications network comprising an attack detection system according to the second aspect of the invention, a computer program directly loadable into a working memory of a data processing apparatus and adapted to implement, when executed, a method according to the first aspect of the invention, and a computer program product comprising such a computer program stored on a computer readable medium.

BRIEF DESCRIPTION OF THE DRAWINGS

The features and advantages of the present invention will be made apparent by the following detailed description of an embodiment thereof, provided merely by way of non-limitative example, description that will be conducted making reference to the annexed drawings, wherein:

FIG. 7 illustrates a mobile communications terminals' state table of the attack detector module of FIG. 2, in an embodiment of the present invention.

DETAILED DESCRIPTION OF THE PREFERRED EMBODIMENT(S) OF THE INVENTION

Figure 1:
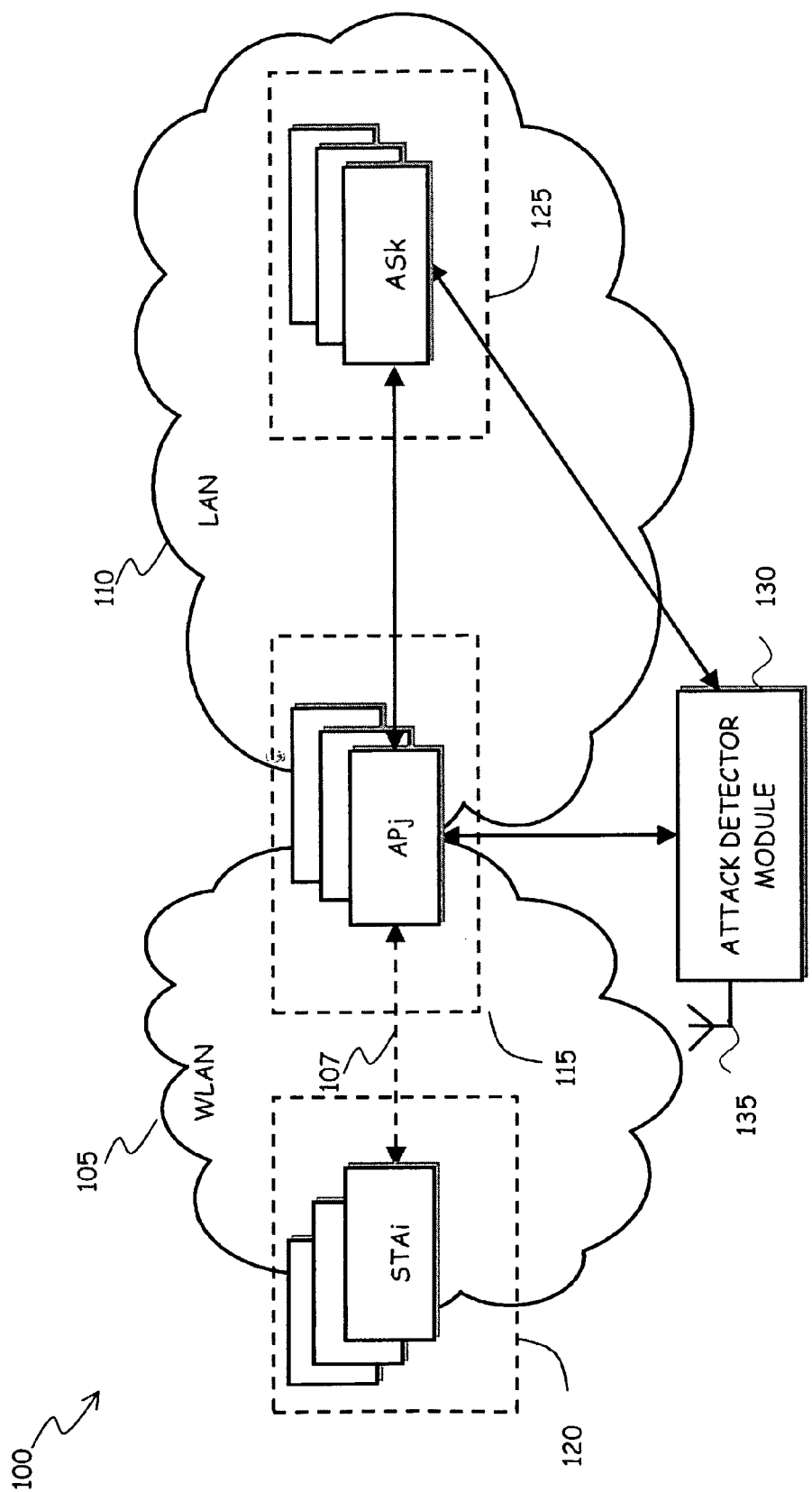
FIG. 1 schematically shows a scenario in which an attack detection system according to an embodiment of the present invention is advantageously used.

Making reference to the drawings, in FIG. 1 a portion of a data communications network is schematically shown in which an attack detection system according to a possible, exemplary embodiment of the present invention is used.

In particular, the data communications network, globally identified by 100, comprises a WLAN 105, particularly a Wi-Fi network (i.e., a wireless network complying with the standard IEEE 802.11), attached to a wired data communications network 110, for example a wired LAN.

The WLAN 105 comprises a plurality 115 of Access Points (APs), like the AP labeled APj in the drawing. Through the APs 115, a variable population 120 of users' mobile communications terminals or mobile STAtions (STAs), including the STA labeled STAi in drawing, can connect, exploiting a radio data communication link 107, to the WLAN.

The WLAN 105 is associated to the wired LAN 110, so that STAs connected to the WLAN 105 can access the wired LAN 110. In particular, the WLAN 105 is associated to the wired LAN 110 through the APs 115.

In the preferred embodiment it is assumed that the WLAN 105 implements the Wi-Fi Protected Access (WPA), according to the IEEE 802.11i standard. However, it is pointed out that the implementation of the IEEE 802.11i standard is not limitative to the present invention, which applies as well to Wi-FI networks not implementing WPA.

As known in the art, the IEEE 802.11i standard has the following main characteristics:
  use of IEEE 802.1X (IEEE standard for local and metropolitan area networks-port-based network exchange) for authentication and key distribution;
  use of keyed Message Authentication Code (MAC), also known as Michael, for packet-level integrity protection;
  use of Temporal Key Integrity Protocol (TKIP) for data encryption; TKIP is intended for interim deployment and retrofit of existing WEP devices, and is motivated by a need to overcome the key derivation and packet integrity weaknesses of WVEP; it retains the WEP frame formats and use of the RC4 algorithm;
  use of CCMP—Advanced Encryption Standard (AES) for data encryption (TKIP is only an intermediate solution; the 802.11i task group has considered the use of the AES algorithm, for both data confidentiality and integrity, as a replacement of the RC4 algorithm);
  use of PSK for authentication without the use of an authentication server, especially suited for domestic environments.

Even if the IEEE 802.1X is an independent standard, it is the core element of the standard IEEE 802.11i, providing a port-based network access control mechanism. The IEEE 802.1X relies on the Extensible Authentication Protocol (EAP—specified in the Request For Comment 3748, downloadable www.ietf.org/rfc/rfc3748.txt at the filing date of the present patent application), an Internet Engineering Task Force (IETF) standard that defines a general-purpose authentication protocol, to permit a wide variety of authentication mechanisms (called "EAP-types"). Moreover, the IEEE 802.1X includes a procedure for dynamic derivation of keys, on a per client and per session basis, embedded in the authentication method.

Without any pretension of completeness (being concept per-se known in the art), the "actors" of the IEEE 802.1X framework are: the "supplicant", the "authenticator" or network port and the "authentication server".

The supplicant is an entity, e.g. a mobile station like the STA STAi in FIG. 1, located at one end of the point-to-point LAN link segment that seeks to be authenticated by an authenticator attached to the other end of that link. The supplicant desires to use a service (MAC connectivity) offered via a port on the authenticator (an AP, a switch, etc.). The supplicant authenticates via the authenticator to a central authentication server, which directs the authenticator about how to provide the service after successful authentication.

The authenticator is an entity that facilitates authentication of the entity attached to the other end of the link; referring to FIG. 1, the authenticator is any one of the WLAN network APs, like the AP APj. The authenticator works in pass-through mode between the mobile station and the authentication server, implementing the control mechanism of the logical doors. The authenticator has two ports of access to the network: the "uncontrolled" port and the "controlled" port. The uncontrolled port is always open to the authentication message transit, whereas the controlled port is only open at the end of the authentication procedure, and only if the procedure has been concluded with success. At the end of authentication procedure the authenticator receives from the authentication server the coding keys, per client and per session, for the next data radio communications with the supplicant.

The authentication server is an entity that provides an authentication service to an authenticator. Referring to FIG. 1, Authentication Servers (ASs) 125, like the AS ASk, are provided within wired LAN 110 for authenticating the STAs 115. The authentication server can be a RADIUS (Remote Authentication Dial-In User Service) server, a Kerberos server, a Diameter server etc., and can be a dedicated appliance (as in the exemplary case depicted in FIG. 1) or be integrated ("co-located") in the authenticator (i.e., in the APs 120).

Examples of ELAP-types supported by the EAP are:
Light Extensible Authentication Protocol (LEAP): it is a proprietary protocol by Cisco Systems and it is based on Microsoft NTChallengeResponse for mutual authentication of supplicant and authentication server;
Extensible Authentication Protocol-Transport Layer Security (EAP-TLS—specified in RFC 2716): it is an IETF protocol based on TLS handshake and uses digital certificates for both supplicant and authentication server authentication;

Protected Extensible Authentication Protocol (EAP-PEAP—downloadable at http://www.drizzle.com/~aboba/EAP/draft-josefsson-pppext-eap-tls-eap-10.txt at the filing date of the present patent application): it is based on TLS handshake; it uses digital certificates for authentication server authentication and any EAP-type for supplicant authentication;

EAP-Tunneled Transport Layer Security (EAP-TTLS—downloadable at http://www.ietf.org/internet-drafts/draft-ietf-pppext-eap-ttls-05.txt at the filing date of the present patent application): it is an IETF draft protocol based on TLS handshake; it uses digital certificates for authentication server authentication and any authentication method for the supplicant;

EAP-SIM (Subscriber Identity Module—downloadable at http://www.ietf.org/internet-drafts/draft-haverinen-pppext-eap-sim-15.txt at the filing date of the present patent application): it is an IETF draft protocol based on second-generation (2G) authentication mechanisms;

EAP-AKA (Authentication and Key Agreement—downloadable at http://www.ietf.org/internet-drafts/draft-arkko-pppext-eap-aka-14.txt at the filing date of the present patent application): it is an IETF draft protocol based on third generation (3G) authentication mechanisms;

EAP-FAST (downloadable at http://www.ietf.org/internet-drafts/draft-cam-winget-eap-fast-01.txt at the filing date of the present patent application): it is an IETF draft protocol that enables the establishment of a mutually authenticated tunnel between the supplicant and the authentication server by means of asymmetric (EAP-TLS) or symmetric cryptography.

The EAP is built around a "challenge-response" communication paradigm. There are four types of messages that are exchanged for authentication purposes: EAP Request messages, EAP Response messages, EAP Success messages and EAP Failure messages. In particular, an EAP Request message is sent to the supplicant indicating a challenge, and the supplicant replies using an EAP Response message. The other two messages notify the supplicant of the authentication procedure outcome.

The EAP protocol is "extensible", i.e., any authentication mechanism can be encapsulated within the EAP Request/EAP Response messages. The EAP messages are themselves encapsulated (as payload) within other packets. For example, the EAP Over LAN (EAPOL) protocol has packets whose headers are specific of the transmission medium, and payload that carries the EAP packets between the authenticator and the supplicant. It primarily provides EAP encapsulation, and also has session start, session logoff notifications. An EAPOL key message provides a way of communicating negotiated session keys. The EAP protocol and some messages of the EAPOL protocol do not contain measures for integrity or privacy protection. The authentication server and the authenticator communicate using the RADIUS protocol. The EAP is carried as an attribute in the RADIUS protocol that contains mechanism for per-packet authenticity and integrity verification between the AP and the RADIUS server.

For example, referring to FIG. 1, and without entering into excessive details per-se well known, when the STA STAi whishes to access the WLAN 105, using the EAP-Type LEAP, the STA sends to the authenticator, e.g. the AP APj, an IEEE 802.11 Probe Request message. The AP replies sending to the STA an IEEE 802.11 Probe Response message, including security parameters, and creates a physical link with that STA. Then, the STA sends to the AP an IEEE 802.11 Open System Authentication request message, to which the AP replies with an IEEE 802.11 Open System Authentication response message. The STA then sends to the AP an IEEE 802.11 Association Request message, and the AP replies sending an IEEE 802.11 Association Response message, with the indication that the operation has been completed successfully. Up to now, the "controlled" port of the AP is still blocked.

The STA STAi than optionally sends to the AP an IEEE 802.1X EAP Start message, and the AP sends to the STA STAi an IEEE 802.1X EAP Request—Identity message, requesting the STA's identity; the STA provides its identity sending to the AP an IEEE 802.1XEAP Response—Identity message, that is forwarded by the AP to the AS, e.g. the AS ASk. The AS then issues, through the AP, an EAP Request authentication message to the STA, which indicates a challenge, and the STA replies sending to the AS (through the AP) an EAP Response authentication message, indicating a challenge response. In case of positive authentication, the AS sends to the STA (through the AP) an, EAP Success message, otherwise it sends an EAP Failure message. During the authentication phase, the (authentication) traffic passes through the uncontrolled port of the AP, and the controlled port is blocked; after the controlled port has been unblocked the traffic passes through the controlled port of the AP.

As already described in the background of the invention section of the present description, the IEEE 802.11 and IEEE 802.11i standards suffer from weaknesses that, expose the wireless and wired LANs to different types of attacks. In particular, examples of attacks that can be perpetrated against the IEEE 802.11 standard are:

RF jamming: this attack is used to take down an entire wireless LAN by overwhelming the radio environment with high-power noise (e.g. sending Request To Send (RTS) and Clear To Send (CTS) packets to degrade the performance of the network, using ad-hoc networks working in the same or adjacent channels of the WLAN causing collision an retransmission, using Bluetooth devices which work in the same frequency range causing interference and signal disruption, etc.);

DoS (Denial of Service): DoS against AP and client is used to cause WLAN unavailability. This type of attack can be carried out in different ways, e.g. flooding an AP or multiple APs with 802.11 management frames. These can include "authenticate" and "associate" frames, designed to fill up the association table of an AP, or "probe request" floods, that can consume excessive processing power on the AP causing AP non-functionality. Another DoS attack exists, called "null probe response attack", with the potential to crash or lock up the firmware of many AP (and NICs). In this attack, a client probe-request frame will be answered by a probe response containing a null SSID. A number of popular AP and NIC cards will lock up upon receiving such a probe response. Another example of DoS is the "Broadcast deauthenticate attack" which is based on the generation of spoofed deauthenticate frames with a broadcast destination address causing disconnection of all stations attached to a given AP;

layer 2-man in the middle: this attack is used to insert an attacker into the datapath between the client and the AP. In such a position, the attacker can delete, add, or modify data in transit on the WLAN from a Wi-Fi client to the AP, and vice versa;

fake AP: this attack is based on the generation of false beacon frames. The purpose is to flood the WILAN with fake AP beacons to confuse legitimate users and to increase the amount of processing client operating systems have to do;

IEEE 802.11 management and control messages forgery: IEEE 802.11 management an control frames aren't protected. They can be forged to accomplish different types of attack, e.g. spoofed deauthenticate frames which are the basis for most DoS attacks and layer 2-man in the middle attacks;

WEP cracking: as mentioned in the foregoing, the WEP protocol suffers from some weaknesses which makes it possible for an attacker to discover the WEP key. The primary means of cracking WEP keys is by capturing IEEE 802.11 frames over an extended period of time and searching for patterns of WEP Initialization Vectors (IVs) that are known to be weak. Knowing the WEP key, an attacker can access the WLAN and decipher all the traffic;

injection of spurious traffic in WEP protected networks: this attack exploits the lack of cryptographic integrity protection over data packets; it is then possible for an attacker to inject spurious traffic in WEP protected networks;

wardriving/network discovery: active scanning is a technique used by popular "wardriving" applications like Netstumbler and Wellenreiter to locate Wi-Fi networks.

The IEEE 802.11i standard allows contrasting several of the vulnerabilities inherent to the IEEE 802.11 standard, but it does not make a Wi-Fi network completely secure: for example, it doesn't give any protection against IEEE 802.11 standard's control and management messages forgery; therefore, IEEE 802.11 standard DoS attacks are always effective, even in a WLAN complying with IEEE 802.11i. Moreover, the IEEE 802.11i standard itself suffers from vulnerabilities, partly due to the standard itself, and partly specific EAP-type design flaws. Examples of attacks against implementations of the IEEE 802.11i standard are the following:

DoS based on attacks against IEEE 802.11i 4-way handshake: at the end of the IEEE 802.1X authentication process, the supplicant and the authenticator performs the 4-way handshake to negotiate the cryptographic parameters. At the beginning of the 4-way handshake the authenticator does not have all the necessary information to compute the MIC to protect integrity and authenticity of the first EAPOL-Key message of the 4-way handshake that it sends to the supplicant. The supplicant accepts all the messages of this type that it receives. An attacker could then send many spoofed first messages of the 4-way handshake to create a memory exhaustion in the supplicant. Moreover, if the supplicant was configured to accept and to complete only one instance of the 4-way handshake with each specific authenticator, then an attacker could send a bad first message to the supplicant with the address of the authenticator, thus forcing the supplicant to drop all subsequent true first messages sent from the real authenticator;

DoS based on massive sent frames of EAPOL-logoff/ EAPOL-start or EAP-success/EAP-failure messages: EAP-Success/Failure, EAPOL-Start and EAPOL-Logoff messages aren't authenticated and then spoofing and, in consequence, DoS attacks against STAs 120 and APs 115 are possible;

DoS based on the exhaustion of EAP identifier space: some implementations of AP can be brought down by starting multiple EAP sessions consuming the EAP identifier space (ranging from 0 to 255);

downgrade of the EAP authentication method forging NAK messages: NAK messages are not protected, and therefore a downgrade of the EAP authentication method towards vulnerable ones (e.g., from EAP-TLS to LEAP) is possible;

downgrade of the cyphersuite negotiation: cyphersuite negotiations for link layer encryption frames are not protected. In some cases it is possible to implement attacks that try to destroy the negotiation between the APs 115 and the STAs 120 to downgrade the cyphersuite negotiation forcing the use of weaker cyphersuites (e.g. from TKIP to WEP);

DoS based on the "manipulation" of the EAP header: the EAP headers are not protected (unless this is envisaged by the individual EAP method adopted) and it is possible to spoof them causing the compromising of the EAP authentication process.

Moreover, there are some other problems which are typical of certain EAP-types, such as:

EAP-SIM/AKA and LEAP do not hide the transmission of the identity;

EAP-SIM can have some problems in guaranteeing an adequate robustness of the keys and the robustness against fake-network attacks;

LEAP is vulnerable to off-line dictionary attacks: LEAP is a Cisco Systems proprietary protocol for performing authentication and coordination of dynamic encryption keys. LEAP contains a design flaw that makes it vulnerable to dictionary-based password guessing attacks. There are tools available on-line used to perform the LEAP attack (e.g. ASLEAP);

PEAPv1, and EAP-TTLS are vulnerable to certain man-in-the-middle attacks.

For all these and other possible problems, WLANs are insecure.

According to an embodiment of the present invention, an attack detection system is provided, comprising an attack detector module (ADM) 130, adapted to detect attacks perpetrated against the WLAN and/or the wired LAN and originated from the WLAN. According to an embodiment of the present invention, the ADM 130, including in particular a software module, interacts with the APs 115 of the WLAN that has to be monitored, and the ASs 125 used to authenticate the STAs 115 of the wireless LAN (optionally, the attack detector module 130 may additionally interact with other elements of the wired network like, e.g., Authentication Server proxies). Through such an interaction, the ADM 130 is capable of detecting attacks against the WLAN and/or the wired LAN, particularly attacks specific of layers 1 and 2 of the TCP/IP protocol stack (according to the seven layer OSI model), originated from the WLAN, as will be described in greater detail in the following.

The ADM 130 can be installed on a dedicated device (an ADM appliance) or it can be co-located (integrated) in, e.g., the operating system of the APs 115; in this second case, a "secure AP" is created.

The ADM 130 is adapted to intercept wireless traffic through one or more wireless LAN network interfaces 135 installed on the ADM 130. Communication with the APs 115 and the ASs 125 (and, optionally, with the other elements of the wired network) can take place over a trusted communications channel, for example through wired LAN.

Figure 2:
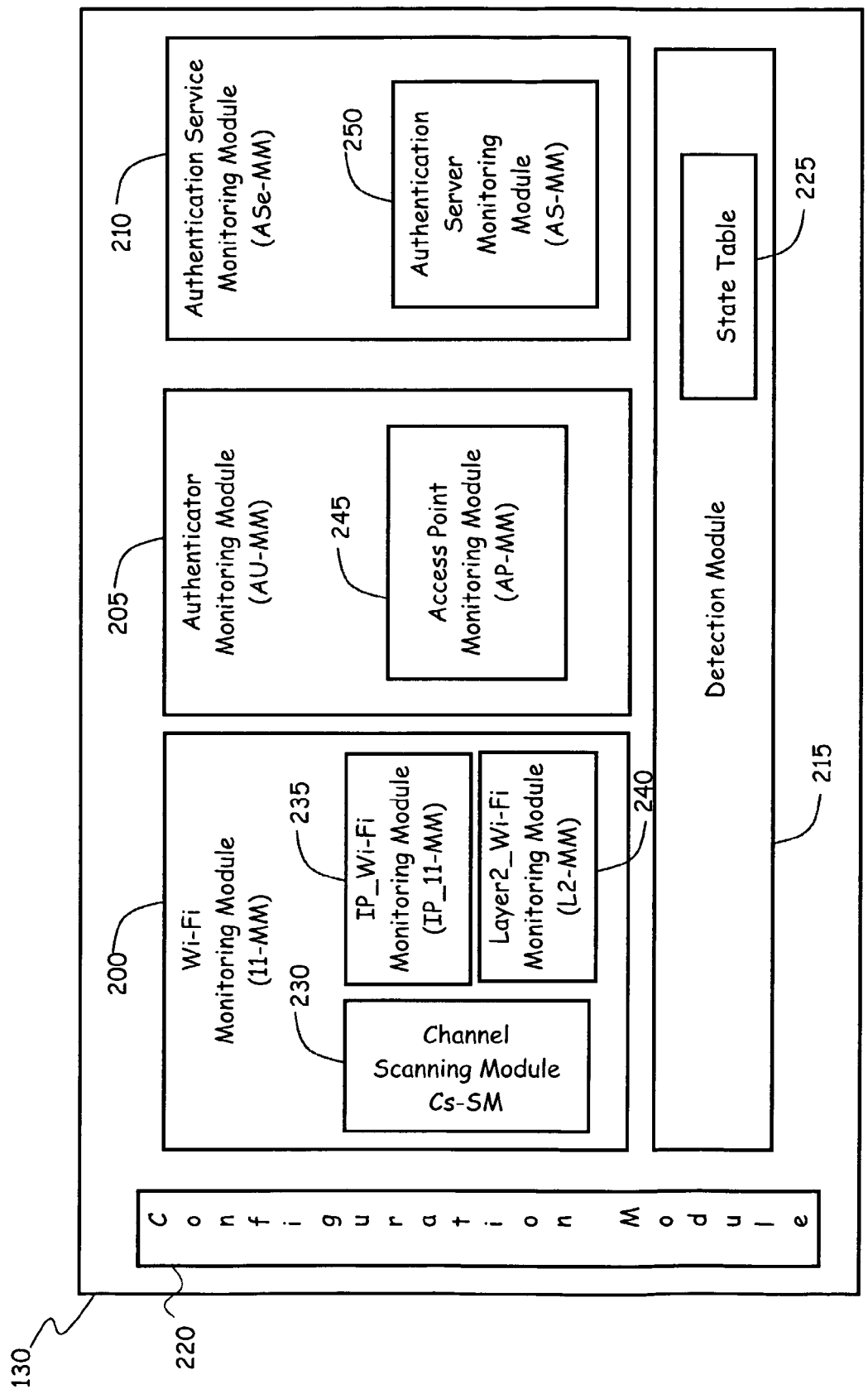
FIG. 2 illustrates in greater detail an attack detector module of the attack detection system of FIG. 1, in terms of its main constituent functional modules and sub-modules, in an embodiment of the present invention.

FIG. 2 illustrates in greater detail the ADM 130 of FIG. 1 from an architectural point of view, in terms of the main constituent functional modules and sub modules, in an embodiment of the present invention.

The ADM 130 may comprise a set of modules, including: a Wi-Fi Monitoring Module (hereinafter, 11-MM) 200, an Authenticator Monitoring Module (hereinafter, AU-MM) 205, an Authentication Service Monitoring Module (hereinafter, ASe-MM) 210, a detection module 215 and a configuration module 220.

According to an embodiment of the present invention, in order to detect attacks, the ADM 130 uses two kinds of information sources: information to be monitored coming from the air, and trusted information coming from the wired network, in particular from the APs 115 and the ASs 125, which act as trusted information sources. In particular, trusted information are the basis on which the detection module 215 works to establish a 25 state of the Wi-Fi network and detect attacks originated from the wireless LAN, in particular by detecting any incoherence with the established network state.

The 11-MM 200 provides signal processing procedures adapted to monitoring IEEE 802.11 signals traveling "over-the-air". The data gathered from this module are those that will be verified in order to detect possible intrusions into the network originated from the WLAN.

The AU-MM 205 provides data processing procedures for collecting trusted information about the state of the STAs 120 in the WLAN 105 from the authenticators, i.e., the APs 115.

Similarly, the ASe-MM 210 comprises data processing procedures adapted to collect trusted information about the state of the STAs 120 in the WLAN 105 from the ASs 125.

Optionally, the ADM 130 can exploit further trusted information, retrieved from the other elements of the wired network, like for example authentication server proxies. In such a case, additional monitoring modules, not depicted in FIG. 2, might be provided for, if needed, to provide data processing procedures for collecting trusted information about the state of the STAs in the monitored WLAN from the other elements of the wired network.

The detection module 215 provides detection procedures for detecting attacks originated from the WLAN. The detection is based on an analysis of the data collected from the 11-MM 200 through the correlation with the trusted information gathered from the AU-MM 205 and ASe-MM 210 modules. In particular, the correlation is performed through the information stored in an IEEE 802.11i state table 225 (to be described in greater detail later on), which is kept constantly updated by the AU-MM 205 and the ASe-MM 210 (and, if present, by the modules gathering information from other trusted information sources).

The configuration module 220 stores information about the configuration of all the modules of ADM 130 like, for example, IP addresses of the monitored APs and ASs, information about the WLAN (APs, ASs, Service Set Identifier—SSID-, Basic SSID—BSSID-, channel, authentication method supported etc.), information about wired network configuration of the ADM 130 (IP address, netmask, default gateway, etc.), the rules to be applied for the detection etc.

Schematically depicted in FIG. 2 are also sub-modules composing the different modules of the ADM 130. In particular, the 11-MM 200 comprises three sub-modules: a Channel Scanning sub-Module (hereinafter, Ch-SM) 230, adapted to intercept IEEE 802.11 frames 501 over the channels defined in the standard (IEEE 802.11a, b, g, h), an IP_Wi-Fi Monitoring sub-Module (hereinafter, IP_11-MM) 235, adapted to intercept, among the intercepted IEEE 802.11 frames, data frames containing IP datagrams, and a Layer2_Wi-Fi Monitoring sub-Module (hereinafter, L2-MM) 240 adapted to intercept, among the intercepted IEEE 802.11 frames, management and control frames, EAP and EAPOL data frames. The AU-MM 205 comprises an Access Point Monitoring sub-Module (hereinafter, AP-MM) 245. The ASe-MM 210 comprises an Authentication Server Monitoring sub-Module (hereinafter, AS-MM) 250.

It is pointed out that FIG. 2 represents only an exemplary embodiment of the invention: other modules and sub-modules, not depicted in FIG. 2, can be added to the ADM 130, if needed, to implement procedures for collecting trusted information about the state of the STAs 120 in the monitored WLAN from the other elements of the wired network.

It is also observed that albeit the different modules and sub-modules of the ADM 130 preferably reside on a same physical platform, they may be spread across several different physical platforms, still retaining the same functionality.

The different modules and sub-modules of the ADM 130 will be hereinbelow described in greater detail.

Figure 3:
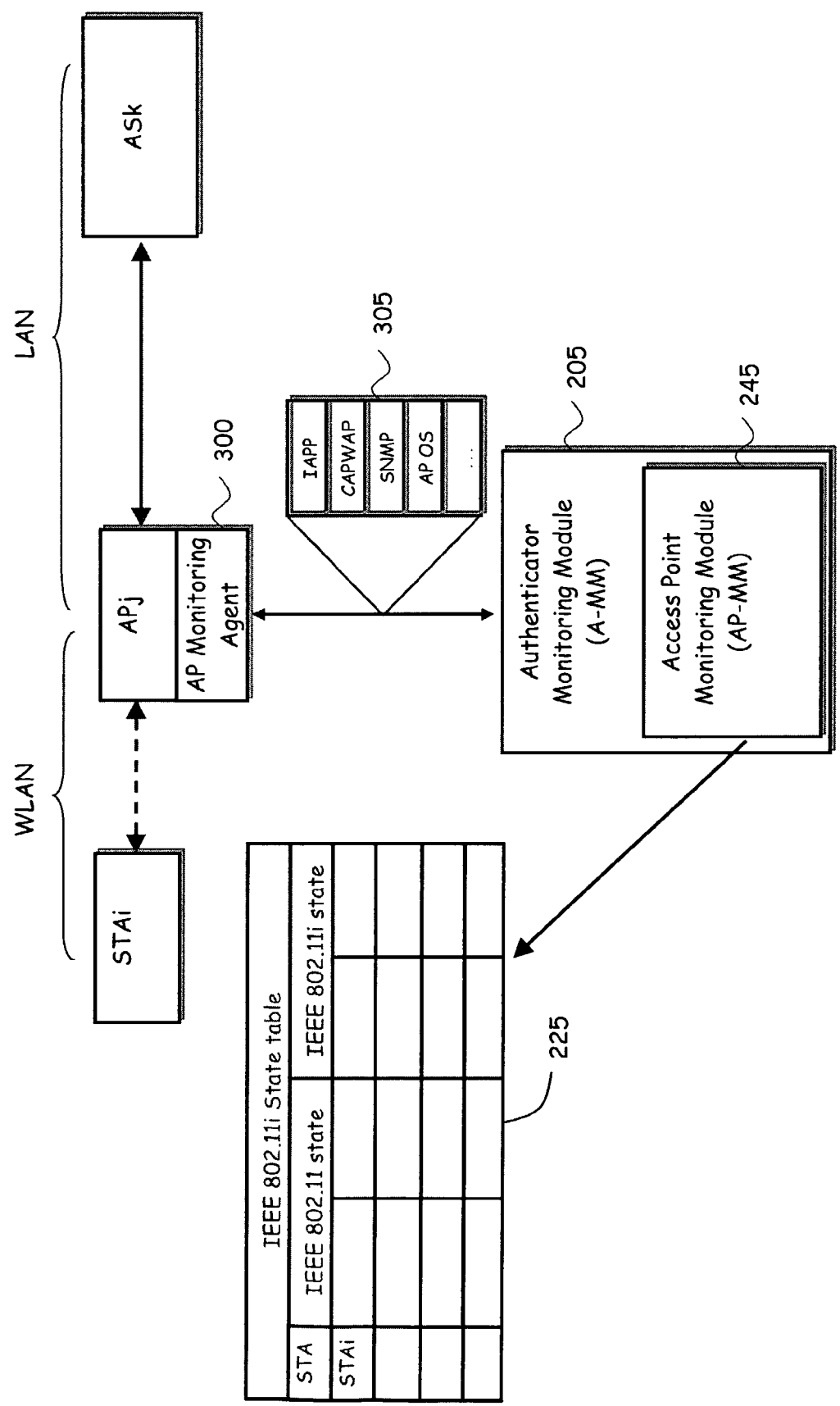
FIG. 3 illustrates in greater detail the function of an authenticator monitoring module of the attack detector module of FIG. 2, in an embodiment of the present invention.

Reference is now made to FIG. 3, illustrating the AU-MM 205 in a way adapted to clarify the function thereof, in an embodiment of the present invention.

In the AU-MM 205, the AP-MM 245 is dedicated to collect trusted information about the STAs 120, e.g., the STA STAi, associated to the APs 115, for example the AP APj. The collected trusted information, including for example information like STA's MAC level identifier, STA's Channel, Association State, Authentication State etc., is used to update a state of each STA 120 in the wireless network as described in the state table 225. In order to collect such information, an AP monitoring agent 300 is provided, which can for example be or include a software running on the generic AP APj and that periodically feeds the AP-MM 245 (as in the case depicted in FIG. 3), or a software running on the ADM 130 and that periodically queries the AP APj.

It is observed that in case the ADM 130 is installed on a dedicated appliance, the communications between the AP monitoring agent 300 and the AP-MM 205 can take place through a trusted communications channel, e.g. via the wired LAN, and can rely on different protocols, schematized as 305 in the drawing, like, for example, SNMP (Simple Network Management Protocol, RFC 1157), CAPWAP (an IETF draft, downloadable via http://www.ietf.org/internet-drafts/draft-ietf-capwan-arch-06.txt at the filing date of the present patent application), IAPP (Inter Access Point Protocol, standardized in "IEEE 802.11F-2003" IEEE Recommended Practice for Multi-Vendor Access Point Interoperability via an Inter-Access Point Protocol Across Distribution Systems Supporting IEEE 802.11 Operation) etc. If the ADM 130 is co-located, the communication between the AP monitoring agent 300 and the AP monitoring module 205 can take place through the AP Operating System (AP OS).

Figure 4:
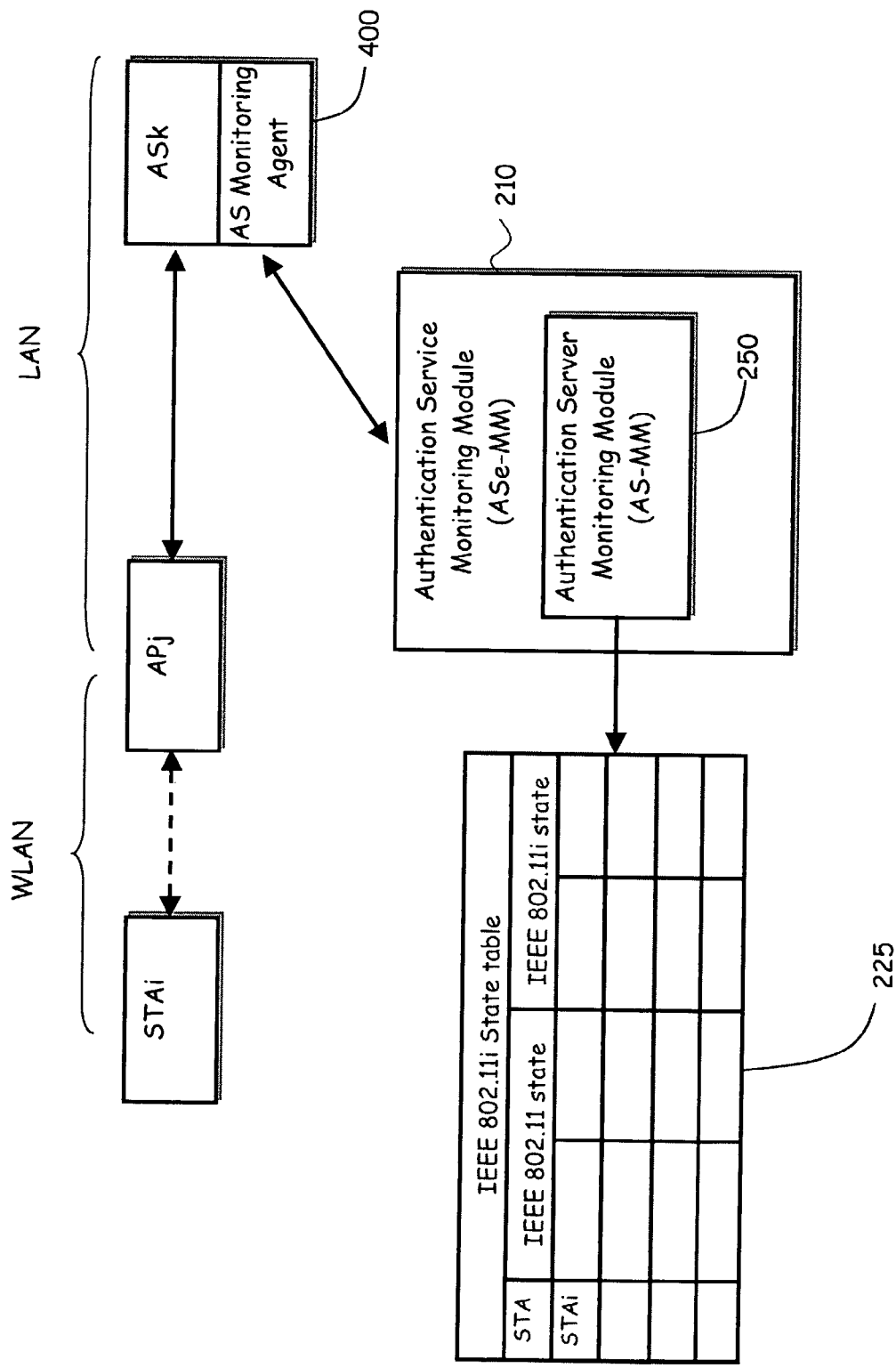
FIG. 4 illustrates in greater detail the function of an authentication service monitoring module of the attack detector module of FIG. 2, in an embodiment of the present invention.

As depicted in FIG. 4, the sub-module AS-MM 250 of the ASe-MM 210 is dedicated to collect trusted information about the authentication state of the generic STA STAi from the AS ASk.

The AS-MM 250 updates the state table 225 with the trusted information provided by the AS ASk. Such trusted information is provided to the AS-MM 250 by an AS monitoring agent 400, which, similarly to the AP monitoring agent 300, can be a software agent running on the AS ASk and that periodically feeds the AS-MM 250 (as is the case depicted in FIG. 4), or, alternatively, it can be a software running on the ADM 130 and that periodically queries the AS ASk. Examples of trusted information provided by the ASs are the EAP method negotiated between the AS e the STA, the state of the STA's IEEE 802.1X Authentication, parameters specific of the EAP type selected (e.g. user ID or Certificate provided by the STA etc.) and the like.

The ASe-MM 210 and the AU-MM 205 represent the source for trusted information about the state of the STAs 120 connected to the Wi-Fi network 105. Optionally, other specific monitoring modules, e.g. authentication server proxies monitoring modules, can be provided for in the ADM 130 to act as further trusted information sources related to the, IEEE 802.1X STA's authentication process. These additional modules can be integrated in the ADM 130 as specific monitoring modules (like the AU-MM 205 and the ASe-MM 210) or as additional sub-modules of the AU-MM 205 and ASe-MM 210.

Figure 5:
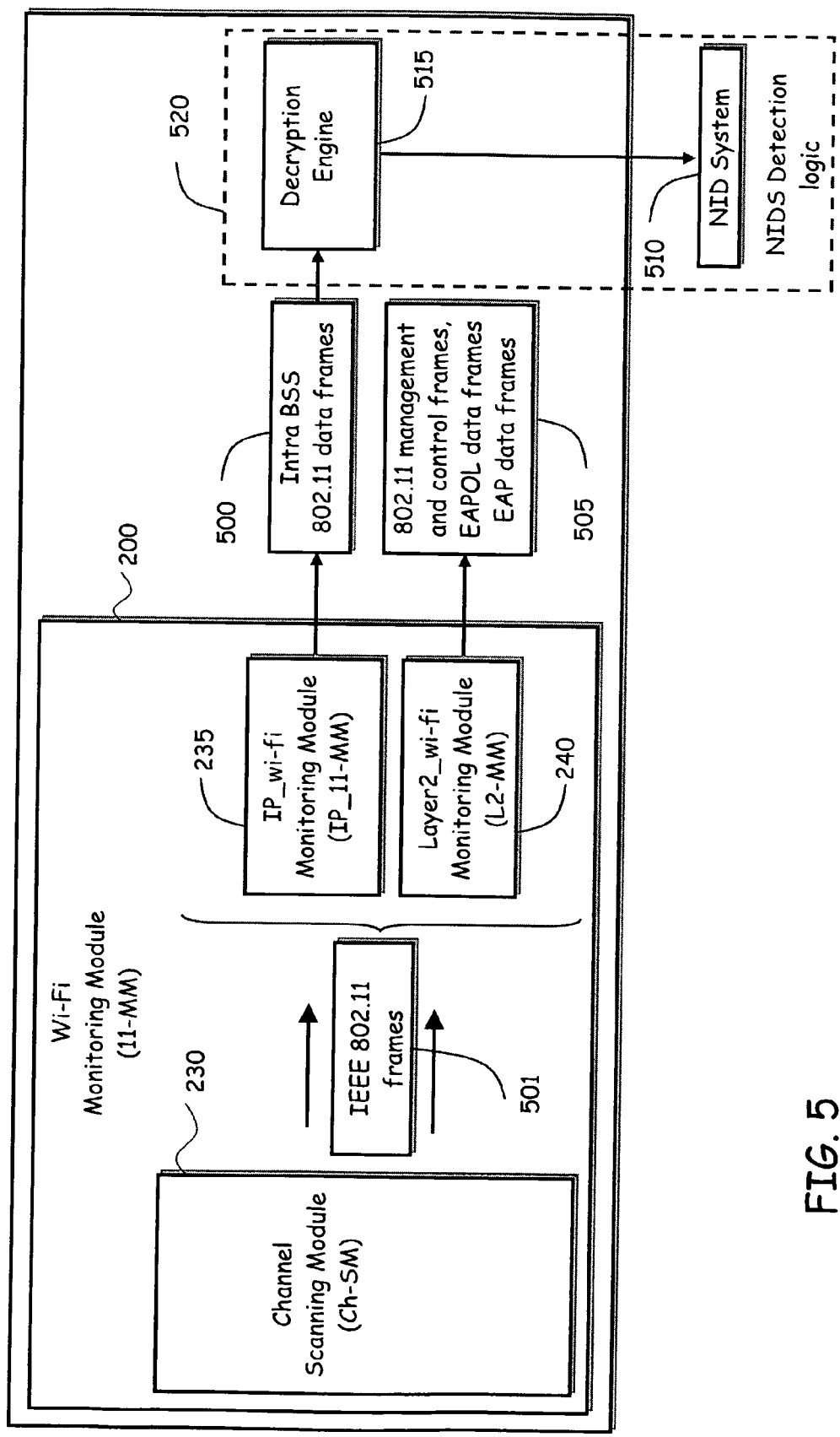
FIG. 5 illustrates in greater detail the function of a Wi-Fi monitoring module of the attack detector module of FIG. 2, in an embodiment of the present invention.

FIG. 5 depicts the 11-MM 200 in a way adapted to understand the operation thereof. The 11-MM 200 is dedicated to capturing and managing wireless traffic "over-the-air". In particular, the three sub-modules 230, 235 and 240 comprised in the 11-MM 200 are each one dedicated to capturing a specific set of the IEEE 802.11/802.11i frames received through the one or more wireless LAN interfaces 135 of the ADM 130, and to monitor specific information.

In particular, the Ch-SM 230 is intended, and thus adapted to intercept IEEE 802.11 frames 501 over the channels defined in the standard (IEEE 802.11a, b, g, h). The IP__11-MM 235 is intended, and thus adapted to intercept, among the IEEE 802.11 frames 501 intercepted by the Ch-SM 230, IEEE 802.11 data frames 500 containing IP datagrams exchanged between the STAs 120 of the Wi-Fi network (intra-BSS 802-11 data frames).

These data can be sent to an external Network Intrusion Detection (NID) System (NIDS) 510, which implements an IP detection logic over the wireless LAN. The NIDS 510 detects attacks typical of the IP layer and upper layers of the TCP/IP protocol stack. In particular, if the Wi-Fi traffic is encrypted, e.g., with WEP or TKIP or CCMP, the intercepted IEEE 802.11 data frames 500 containing the IP datagrams need to be decrypted before being sent to the external NIDS: a specific decryption engine 515 is thus preferably implemented in the ADM 130 for decrypting the IEEE 802.11 data frames 500 containing the IP datagrams. The decryption engine 515 and the external NID System 510 form a NIDS detection logic 520. Information about the encryption algorithm and the encryption keys used are provided to the decryption engine 515 by the state table 225.

The L2-MM 240 is instead intended and adapted to intercept, among the IEEE 802.11 frames 501 intercepted by the Ch-SM 230, IEEE 802.11 management and control frames, EAP and EAPOL data frames 505 exchanged in the Wi-Fi network.

The configuration module 220 stores information about the configuration of all the modules of the ADM 130. In particular, the configuration module comprises configuration details for each module and sub module of the ADM 130 like, for example, the channels to be monitored for the Ch-SM 230, the IP addresses of the APs monitored and the correspondent communication protocol used for the AU-MM 205, the IP addresses of the ASs monitored for the ASe-MM 210, the rules to be applied for the detection and information about Wi-Fi network configuration for the detection module 215. The Wi-Fi network configuration can be manually configured on the ADM 130, or it can be set via a "learning process"; during the learning process the ADM 130 collects the Wi-Fi traffic and elaborates it to obtain information about the wireless LAN network (SSID, BSSID, channel, authentication method supported etc.).

Figure 6:
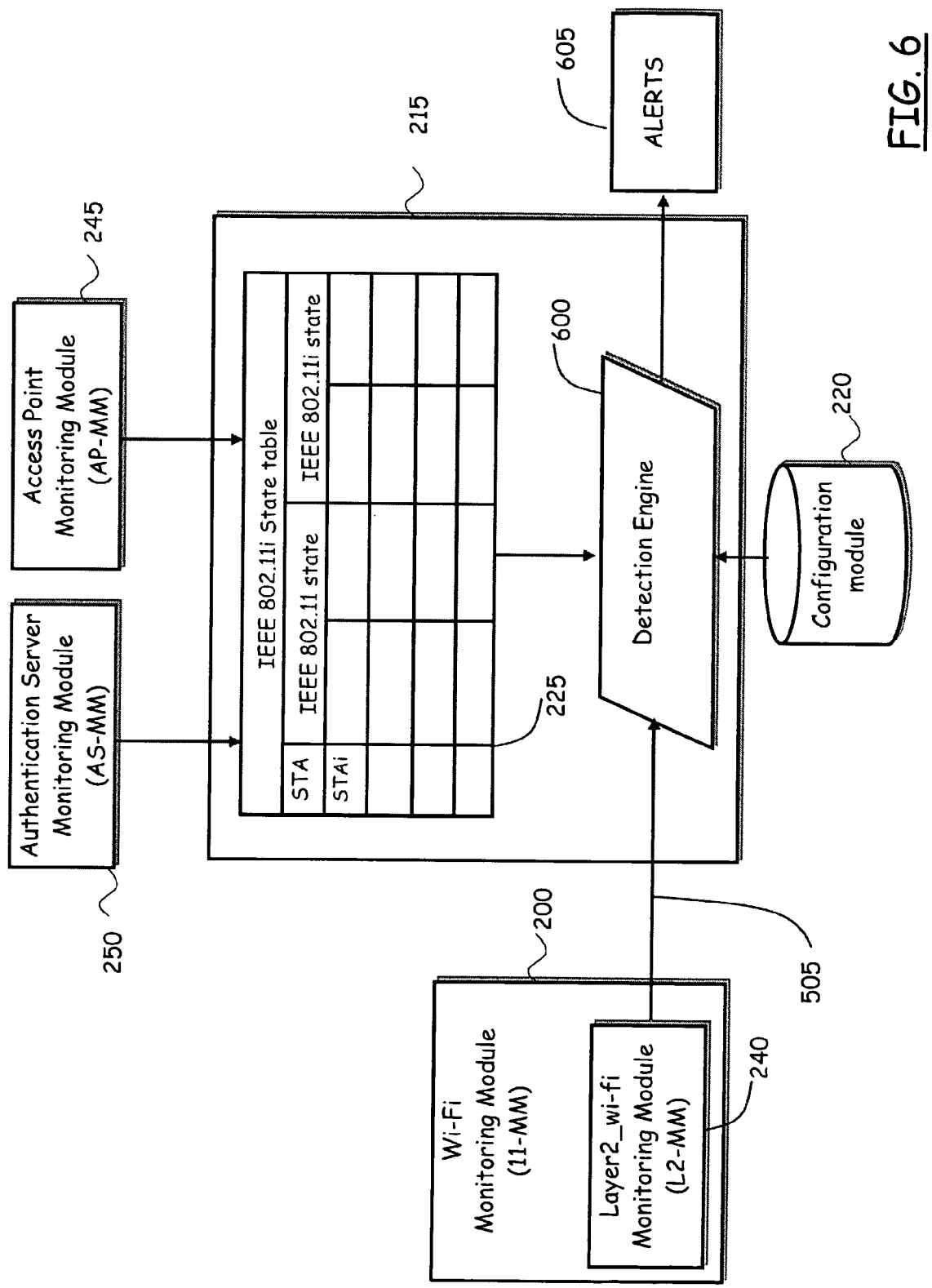
FIG. 6 illustrates in greater detail an attack detection logic implemented by a detection module of the attack detector module of FIG. 2, in an embodiment of the present invention.

The detection module 215, depicted in FIG. 6, comprises the state table 225 and a detection engine 600.

The detection module 215 has in particular the function of detecting attacks at the physical (layer 1) and link (layer 2) layer level in the WLAN 105, even in presence of IEEE 802.11i implementations, and any violation of security policy originated from the Wi-Fi network 105 against the wired LAN network 110 or WLAN network itself. In particular, in an embodiment of the present invention, such a detection is performed by correlating trusted information stored in the state table 225, concerning the state of the STAs retrieved from the wired network, in the example considered the APs and the ASs, and also information stored in the configuration module 220, with the monitored wireless traffic.

In greater detail, the state table 225 represents the state of each of the STAs 120, like the generic STA STAi, in the WLAN 105. A possible implementation of the state table 225 is depicted in FIG. 7. The state table includes an entry for each STA, and each entry has a plurality of fields; the plurality of fields of the generic state table entry is divided into a first set of fields, relating to IEEE 802.11 parameters, and a second set of fields, describing IEEE 802.11i parameters; the fields in this second set are used only if the WLAN 105 implements the IEEE 802.11i standard.

In FIG. 7, the generic STA STAi is denoted as "MAC-CLi" (an identifier of the generic station at the MAC layer level). The fields related to the IEEE 802.11 state include, for example, the channel used (field "ch"), the BSS (Basic Service Set) identifier (field "BSSID"), the ESS (Extended Service Set) identifier (field "ESSID"), to which the STA is associated, the IEEE 802.11 state of the terminal (authentication state—field "Aut. state"—and association state—field "Ass.state"), the cryptographic cyphersuite (field "802.11 Cryptographic cyphersuite") etc.

The fields related to the IEEE 802.11i state are, for example, the use of PSK or IEEE 802.1X for the authentication of the STAs (field "Authentication and Key Management Protocol PSK/802.1X"), the EAP-type agreed (field "EAP method negotiated"), the STA's EAP identifier (field "EAP ID"), the IEEE 802.1X state (and related parameters) (field "802.1x state"), the pairwise cryptographic cyphersuite (field "Pairwise cryptographic cyphersuite"), the group cryptographic cyphersuite (field "Group cryptographic cyphersuite"), the state of the 4-way handshake process (field "4-way handshake state"), etc.

The state table 225 is filled and updated in real time, exploiting the information provided by the AS-MM 250 and the AP-MM 245 (and, if provided, by other monitoring modules providing trusted information about the monitored WLAN). The state table 225 depicted in FIG. 7 is merely exemplary: other fields can be added (e.g., the LEAP challenge sent to the STA by the AS for LEAP authentication), or the shown fields can be modified or deleted according to the authentication mechanism used (i.e. the EAP-type) and the kind of trusted information sources employed.

The detection engine 600 receives wireless traffic from the L2-MM 240 of the 11-MM 205. This traffic comprises, as mentioned in the foregoing, IEEE 802.11 management and control frames, EAP and EAPOL data frames 505. The detection engine 600 correlates the information contained in the frames 505 intercepted "over-the-air" with the state of the Wi-Fi network 105, particularly of the STAs, as described in the state table 225, and with information about the configuration of the Wi-Fi network 105 stored in the configuration module 220, like the list of known APs, the channels used, the encryption and authentication method used etc. If the information obtained "over-the-air" from the WLAN 105 is not coherent with the state and the configuration of the Wi-Fi network as described in the state table 225 and the configuration module 220, the detection engine 600 generates (an) alert(s) 605, adapted to describe the attack or security policy violation originated from the WLAN 105. The alert(s) 605 may be exploited by an external system for visualization and storage.

Figure 8:
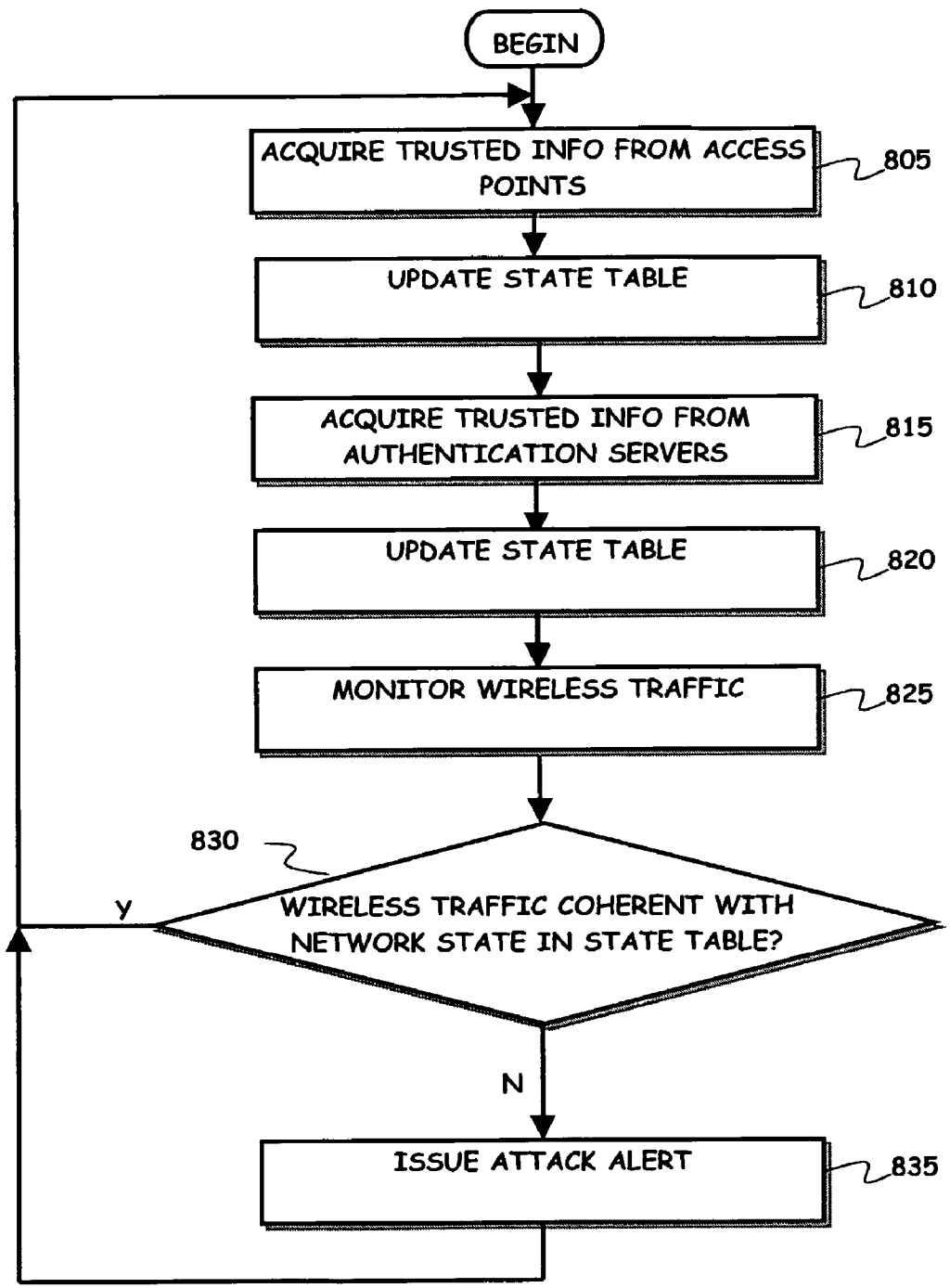
FIG. 8 is a very simplified flowchart depicting the main steps of an attack detection method according to an embodiment of the present invention.

According to an embodiment of the present invention, a detection method implemented by the ADM 130 includes the main steps represented in the flowchart of FIG. 8. The ADM 130 acquires trusted information from the APs 115 (block 805) and from the ASs 125 (block 815), and, based on the acquired information, keep the state table 225 constantly updated (blocks 810 and 820). The ADM 130 also monitors the wireless traffic (block 825) and compares a network state derivable from the wireless traffic with the ("trusted") network state described in the state table 225 (decision block 830). If any incoherence is detected (exit branch N of decision block 830), the ADM 130 issue (an) alert(s) (block 835).

In the following, two examples of attacks are discussed that are explicative of the operation of the ADM's detection logic, and how it can be applied to both IEEE 802.11 networks and IEEE 802.11i protected networks so as to reduce false positives and negatives and to detect attacks (even not known yet) which violate the IEEE 802.11 and IEEE 802.11i state machine.

EXAMPLE 1

Deauthentication Attack

In this first example, it is assumed that in the WLAN 105 no IEEE 802.11i is implemented. In absence of IEEE 802.11i implementation, the ASe-MM 210 of the ADM 130 is not used, and only the state table set of fields concerning the IEEE 802.11 parameters are filled (the IEEE 802.11i set of fields is left blank).

Let a generic STA, like the STA STAi, be considered, that is associated and authenticated to an AP, e.g. the AP APj.

An hypothetical WLAN attacker passively sniffs the "over-the-air" WLAN 105 traffic, looking for authenticated STAs, like the STA STAi.

Meanwhile, also the ADM 130 constantly scans the traffic "over-the-air", to check all the frames traveling within the WLAN 105. At the same time, the state table 225 is constantly updated by the AP-MM 200; in particular, in the state table 225 there is an entry indicating the parameters of the STA STAi (MAC_CLi, channel, etc., as described in the foregoing).

When the attacker has found the authenticated STA STAi, the attacker sends one or more deauthentication frames to the victim STA STAi, spoofing the MAC address so as to force the deauthentication of the STA.

The STA STAi thus receives one or more IEEE 802.11 deauthentication frames with source MAC identical to that of the AP APj, and looses the link to the AP.

The ADM 130 intercepts the deauthentication frames that, in terms of MAC, appear to have been sent by the AP APj to the STA STAi. These frames are however not coherent with the state of the STA STAi as described in the state table 225 (derived by the AP APj), which in particular indicates that STA as being properly authenticated and 15 associated. The ADM 130 detects such incoherence, and thus realizes that an attack is being perpetrated; the ADM 130 thus issues an alert related to a spoofed deauthentication frame. The alert may be exploited by an external system for visualization and storage.

EXAMPLE 2

LEAP Attack

In this second example, an IEEE 802.11 WLAN with IEEE 802.1X implementation is considered. Both the AP-MM 245 and the AS-MM 250 are used to constantly update the state table 225.

Let it be assumed that a generic STA, like the STA STAi, is associated with and authenticated to an AP, e.g. the AP APj, using IEEE 802.1X LEAP EAP-type.

In the state table 225 there is an entry in respect to the STA STAi indicating the IEEE 802.11 and IEEE 802.11i parameters (MAC_CLi, channel, ESSID, . . . ) of that STA, as described in the foregoing.

The ADM 130 scans the WLAN traffic "over-the-air" so as to check the frames inside the WLAN 105. At the same time, the AP-MM 245 and the AS-MM 250 keep the state table 225 constantly updated.

An hypothetical attacker passively sniffs the WLAN 105 looking for authenticated STAs, like the STA STAi. When the attacker finds an authenticated STA, like the STA STAi, the attacker sends one or more deauthentication frames to the victim STA, spoofing the source MAC address so as to force the deauthentication of the STA.

The STA STAi thus receives one or more IEEE 802.11 deauthentication frames with source MAC identical to that of the AP APj to which it is authenticated.

The ADM 130 catches the deauthentication frames that seems to have been sent by the AP APj to the STA STAi. These frames are however not coherent with the state of the STA STAi in the state table 225 (wherein that STA is described as authenticated). The ADM 130 detects such incoherence, realizes that an attack is being perpetrated, and issues an alert related to a spoofed deauthentication frame.

In consequence to the spoofed deauthentication frames received from the attacker, the STA STAi looses the link to the AP APj. In the state table 225, the entry related to the STA STAi shifts to an IEEE 802.11 deauthenticated state and disassociated state.

The STA STAi starts probing the WLAN 105 looking for the AP APj. The AP APj sends a probe response to the probing STA STAi. The ADM 130, catching the frames "over-the-air", updates the states of STA STAi in the state table 225: the entry in respect to the STA STAi changes to an IEEE 802.11 probing state.

In the meanwhile, the attacker keeps on passively sniffing the traffic in the WLAN 105.

In reply to the probe response received from the AP APj, the STA STAi starts a procedure of IEEE 802.11 authentication and reassociation to the AP APj. The AP APj accepts the IEEE 802.11 authentication and reassociation of the STA STAi.

The ADM 130 updates the states of STA STAi in the state table 225: the entry in respect to the STA STAi changes to an IEEE 802.11 authenticated and reassociated state.

In the meanwhile, the attacker is still passively sniffing the WLAN 105.

The STA STAi then starts the IEEE 802.11i LEAP authentication process (EAPOL-Start); the AP APj starts the IEEE 802.1X LEAP authentication of the STA STAi by requesting the STA identity (EAP-Request Identity message).

The ADM 130 updates the state of STA STAi in the state table 225: the state of the STA STAi changes to IEEE 802.1X authenticating state; correspondent IEEE 802.11i parameters are filled (authentication protocol: IEEE 802.1X, EAP-type: LEAP, etc.).

The attacker is still passively sniffing the "over-the-air" traffic of the WLAN 105.

The STA STAi provides to the AP APj the user identity (EAP—Response Identity message); the user identity is sent in plain text, and the attacker, passively sniffing the WLAN 105, can thus record the provided user identity sent to the AP APj.

The AP APj receives the user identity from the STA STAi, records the identity if the STA and contacts the AS ASk for authentication of the STA.

The ADM 130 updates the states of the STA STAi in the state table 225: the user identity is stored in the "EAP ID" field for the STA STAi entry.

The AS ASk sends a LEAP challenge to the STA (EAP-Request LEAP message); the STA STAi receives a LEAP challenge with source MAC equal to that of the AP APj (EAP-Request LEAP message).

The ADM 130 updates the states of the STA STAi in the state table 225: the LEAP challenge sent to the STA STAi by the AS ASk is stored in the "802.1X state" field of the state table entry in respect of that STA.

The STA STAi responds to the LEAP challenge with a LEAP challenge response (EAP-Response LEAP message). The AS ASk receives the LEAP challenge response from the STA STAi.

The ADM 130 updates the state of the STA STAi in the state table 225: the "802.1X state" field in the table entry relating to that STA is changed to client EAP-Response LEAP.

The AS ASk verifies the received STA's credentials (User ID and Password). If the credentials of the STA STAi are correct, the AS ASk sends an EAP-Success message.

The ADM 130 detects the EAP-Success message, and updates the state table 225, changing the state in the field "802.1X state" to "successful client authentication" (or, simply, "authenticated").

Let it be assumed that while the AS ASk is verifying the STA's credentials, and before the STA STAi receives the EAP-Success message that will be sent by the AS ASk, the attacker sends a LEAP challenge to the STA STAi, spoofing the source MAC of the AP APj. The STA STAi receives another LEAP challenge with source MAC equal to that of the AP APj (EAP-Request LEAP message). The ADM 130 detects an EAP-Request LEAP frame from the AP APj to the STA STAi. This frame is not coherent with the state (client EAP-Response LEAP) of the STA STAi in the field "802.1X state" of the state table 225. The challenge contained in the EAP-Request message is different from that stored in the "802.1X state" field in the state table: thus, the ADM 130 issues an alert related to a LEAP attack.

Meanwhile, the STA STAi responds to the LEAP challenge from the attacker with a LEAP challenge response (EAP-Response LEAP message—NTchallengeResponse). If the AS ASk receives this additional LEAP challenge response from the STA STAi after having sent the EAP-success, the additional LEAP challenge response is simply ignored. However, the attacker intercepts the LEAP challenge response of the victim STA STAi sent in reply to the attacker's LEAP challenge, and uses it to obtain off-line the user ID and password. The user ID is known, having been previously sniffed in the EAP-Response Identity message; the password is obtained with a "brute-force" attack using the challenge sent from the AP to the STA and the NTChallengeResponse obtained from the victim in the EAP-Response LEAP message.

The ADM 130 analyzes all the frames sent by the AP to the STA and detects the incoherence with the information of the STA saved in the state table 225. So the ADM 130 issues an alert, that may be exploited by an external system for visualization and storage.

These two examples are not exhaustive, and are simply provided to illustrate the logic of operation of the ADM 130. Several other types of attacks can be detected by the ADM 130 following a same or similar logic, by detecting any incoherence between STAs' current state (as described in the state table) and traffic over the network.

The attack detector module according to the described embodiment of the invention is thus adapted to detect attacks in a generic WLAN, particularly in WLANs wherein the communications between the mobile communications terminals and the network's access points is done through the IEEE 802.11a, b, g or h standard, and is also applicable to future versions of the same standard.

In particular, the described attack detector module is capable of detecting attacks at the physical and link layer levels of Wi-Fi networks, like cloning station attacks, fictitious disassociation of the client (station), jamming and DoS attack against access points, and is also capable of detecting attacks exploiting vulnerabilities of the IEEE 802.11i standard and its implementations, such as attacks against the 4-way handshake, attacks against IEEE 802.1X like, for example, DoS based on massive sent frames of EAPOL-Logoff/EAPOL-start or EAP-Success/EAP-Failure, DoS based on the exhaustion of EAP Identifier Space, attacks that exploit flaws specific of EAP-types (like attacks to LEAP, EAP-SIM, PEAPv1 and TTLS etc.), attacks that try to destroy the negotiation between the access points and the mobile stations to downgrade the cipher suite negotiation.

Thanks to the detection logic implemented, the attack detector module described is capable of detecting attacks typical of WLANs with consistent reduction of false positives and negatives.

Moreover the flexibility of the detection logic implemented also allows detecting attacks not known yet against IEEE 802.11 and IEEE 802.11i which violates IEEE 802.11 or IEEE 802.11i state machine. The IEEE 802.11i state table 225 represents the state of the WLAN (of each wireless client and AP) at the generic point of time. It is than possible, monitoring the traffic on the WLAN, to verify whether the wireless frames intercepted by the Ch-SM 230 are coherent with the state of the WLAN described in the IEEE 802.11i state table. For example, if the ADM 130 detects on the Wi-Fi interface 135 the first message (EAPOL-key) from the AP, e.g. the AP APj, to the STA, e.g. the STA STAi, of a 4-way handshake, but, in the IEEE 802.11i state table 225 the STA STAi is still in the 802.1x authenticating state, this is a clear violation of the IEEE 802.11i state machine and the ADM 130 issues an alert related to this violation.

In addition to being able to detect attacks at the lower OSI levels, the described attack detector module also makes it possible to efficiently monitor and detect attacks in the WLAN over layer 3 and above of the OSI seven layer model, through the interaction with an external network intrusion detection system.

Although the present invention has been disclosed and described by way of some embodiments, it is apparent to those skilled in the art that several modifications to the described embodiments, as well as other embodiments of the present invention are possible without departing from the scope thereof as defined in the appended claims.

The invention claimed is:

1. A method performed by an attack detector module for detecting attacks in a wireless data communications network which includes at least one trusted apparatus and a communications terminal that is assigned a dynamic network state corresponding to wireless traffic exchanges of the communications terminal, the method comprising:
  acquiring a first trusted network state for the dynamic network state of the communications terminal;
  acquiring trusted information via a trusted channel, wherein the trusted information is indicative of a communication between the communications terminal and the at least one trusted apparatus and the trusted channel is different from the wireless data communications network;

updating the first trusted network state to a second trusted network state for the dynamic network state of the communications terminal, wherein the second trusted network state is different from the first trusted network state and the updating is based on the trusted information;

monitoring, via a wireless traffic monitor, wireless traffic over the wireless data communications network;

deriving a non-trusted network state for the dynamic network state of the communications terminal from the monitored wireless traffic;

comparing the non-trusted network state with the second trusted network state; and determining a wireless network attack in case of incoherence between the non-trusted network state and the second trusted network state.

2. The method according to claim 1, wherein said at least one trusted apparatus comprises at least one access point of the wireless data communications network, the communications terminal is a mobile communications terminal, and said acquiring trusted information comprises acquiring trusted information about a current state of the mobile communications terminal from said at least one access point.

3. The method according to claim 2, wherein the wireless data communications network is a network compliant with the IEEE 802.11 standard.

4. The method according to claim 3, wherein said trusted information about a current state of the mobile communications terminal acquired from the at least one access point comprises one or more among a medium access control level identifier of the mobile communications terminal, a communications channel used by the mobile communications terminal, a service set identifier, a basic service set identifier, an association state of the mobile communications terminal, and an authentication type and state of the mobile communications terminal.

5. The method according to claim 3, wherein said at least one trusted apparatus comprises at least one authentication server for authenticating the mobile communications terminal in accordance with an authentication protocol, and said acquiring trusted information comprises acquiring trusted information about a current state of the mobile communications terminal from the at least one authentication server.

6. The method according to claim 5, wherein said authentication protocol complies with IEEE 802.11i standard.

7. The method according to claim 6, wherein said trusted information about a current state of mobile communications terminal acquired from the at least one authentication server comprises one or more among information indicative of an authentication and key management protocol, information indicative of an extensible authentication protocol method negotiated between the mobile communications terminal and the authentication server and of parameters specific of the negotiated extensible authentication protocol method, information indicative of an authentication state of the mobile communications terminal, information indicative of a cyphersuite for cyphering, information indicative of a state of a handshake procedure between the mobile communications terminal and the authentication server.

8. The method according to claim 5, wherein said deriving the non-trusted network state and updating the first trusted network state to a second trusted network state further comprises exploiting configuration information indicative of a configuration of the wireless data communications network.

9. The method according to claim 8, wherein said configuration information comprises one or more among a list of access points of the wireless data communications network and address information thereof, a list of wireless data communications network channels, a list of communications protocols, a list of authentication servers and address information thereof, and a list of encryption and authentication methods.

10. The method according to claim 5, wherein said monitoring wireless traffic comprises intercepting one or more among data frames, management frames, control frames, extensible authentication protocol and extensible authentication protocol over local area networks data frames.

11. The method according to claim 1, further comprising issuing alerts in case said wireless network attack is determined.

12. The method according to claim 1, wherein the trusted channel comprises a wired connection between the attack detector and the at least one trusted apparatus.

13. A system for detecting attacks in a wireless data communications network which includes at least one trusted apparatus and a communications terminal that is assigned a dynamic network state corresponding to wireless traffic exchanges of the communications terminal, the system comprising:

a network monitor for acquiring a first trusted network state for the dynamic network state of the communications terminal, and further for acquiring trusted information via a trusted channel, wherein the trusted information is indicative of a communication between the communications terminal and the at least one trusted apparatus and the trusted channel is different from the wireless data communications network, and to update, based on the trusted information, the first trusted network state to a second trusted network state for the dynamic network state of the communications terminal, wherein the second trusted network state is different from the first trusted network state;

a wireless traffic monitor for monitoring wireless traffic over the wireless data communications network and to derive a non-trusted network state for the dynamic network state of the communications terminal from the monitored wireless traffic; and an attack detector engine for comparing the non-trusted network state with the second trusted network state, and to determine a wireless network attack in case of incoherence between the non-trusted network state compared to the second trusted network state.

14. The system according to claim 13, wherein said at least one trusted apparatus comprises at least one access point of the wireless data communications network, the communications terminal is a mobile communications terminal, and said information comprises information about a current state of the mobile communications terminal acquired from said at least one access point of the wireless data communications network.

15. The system according to claim 14, wherein the wireless data communications network is a network compliant with the IEEE 802.11 standard.

16. The system according to claim 15, wherein said trusted information about a current state of the mobile communications terminal acquired from the at least one access point comprises one or more among a medium access control level identifier of the mobile communications terminal, a communications channel used by the mobile communications terminal, a service set identifier, a basic service set identifier, an association state of the mobile communications terminal, and an authentication type and state of the mobile communications terminal.

17. The system according to claim 15, wherein said at least one trusted apparatus comprises at least one authentication server for authenticating the mobile communications terminal in accordance with an authentication protocol, and said trusted information comprises trusted information about a current state of the mobile communications terminal acquired from the at least one authentication server.

18. The system according to claim 17, wherein the wireless data communications network is further compliant with the IEEE 802.11i standard.

19. The system according to claim 18, wherein said trusted information about a current state of the mobile communications terminal acquired from the at least one authentication server comprises one or more among information indicative of an authentication and key management protocol, information indicative of an extensible authentication protocol method negotiated between the mobile communications terminal and the authentication server and of parameters specific of the negotiated extensible authentication protocol method, information indicative of an authentication state of the mobile communications terminal, information indicative of a cyphersuite for cyphering, and information indicative of a state of a handshake procedure between the mobile communications terminal and the authentication server.

20. The system according to claim 17, further comprising a database for storing said trusted information.

21. The system according to claim 17, further comprising a configuration unit for storing configuration information indicative of a configuration of the wireless data communications network, said configuration information being exploited by the wireless traffic monitor for deriving the non-trusted network state, and by the network monitor for updating the first trusted network state to the second trusted network state.

22. The system according to claim 21, wherein said configuration information comprises one or more among a list of access points of the wireless data communications network and address information thereof, a list of wireless data communications network channels, a list of communications protocols, a list of authentication servers and address information thereof, and a list of encryption and authentication methods.

23. The system according to claim 17, wherein said wireless traffic monitor is configured to intercept one or more among data frames, management frames, control frames, extensible authentication protocol and extensible authentication protocol over local area networks data frames.

24. The system according to claim 13, wherein the attack detector engine issues alerts in case said wireless network attack is determined.

25. A wireless data communications network comprising the system for detecting attacks according to claim 13.

26. The system according to claim 13, wherein the trusted channel comprises a wired connection between the attack detector and the at least one trusted apparatus.

27. A non-transitory computer readable medium encoded with a computer program directly loadable into a working memory of a data processing apparatus and comprising software code portions for implementing the method according to claim 1.

* * * * *